(No Model.) 2 Sheets—Sheet 2.

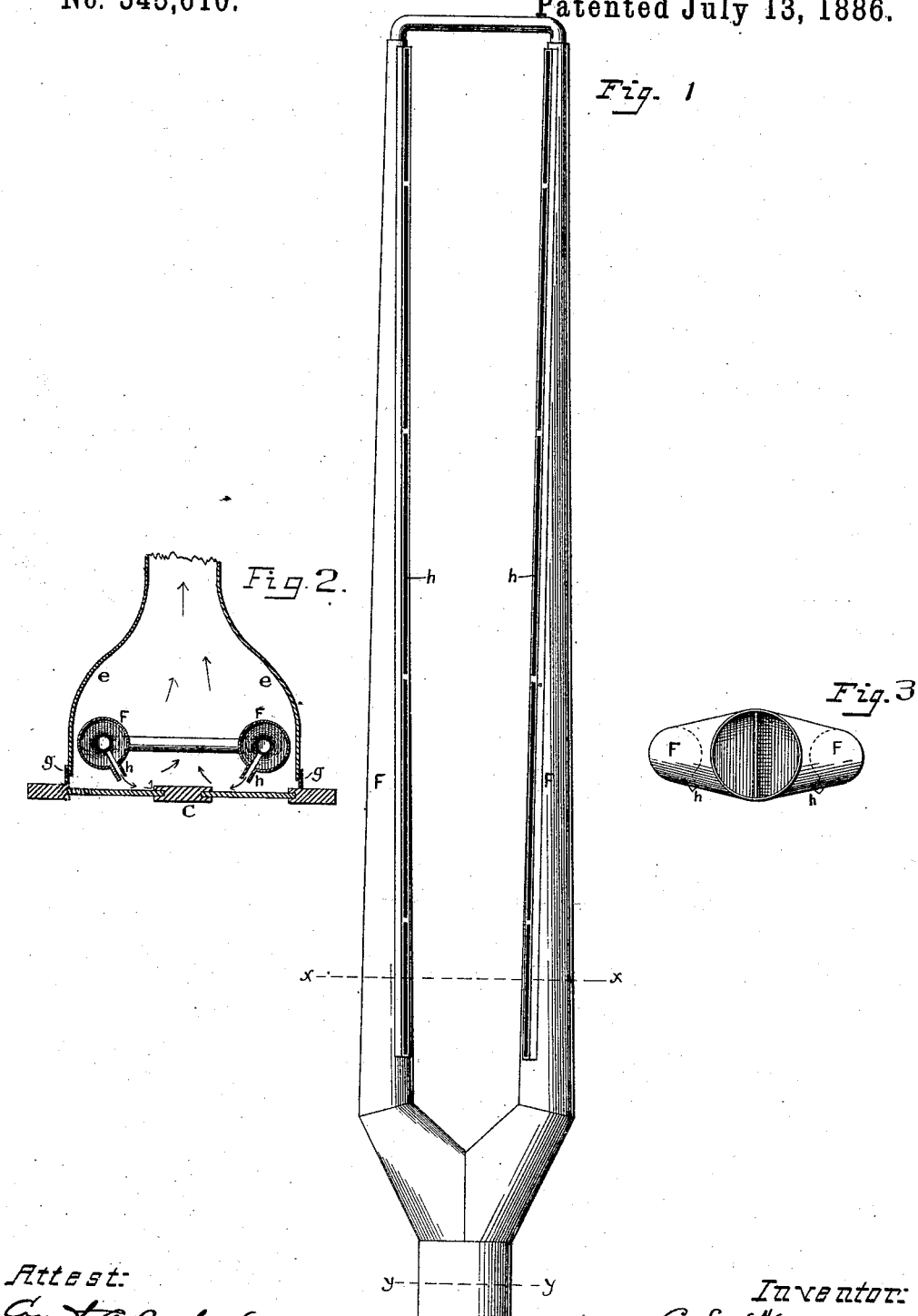

C. L. WOOD.
DUST REMOVING APPARATUS.

No. 345,610. Patented July 13, 1886.

Attest:
Cout A Cooper
J. B. McGirr

Inventor:
C. L. Wood
By R D O Smith
his Atty

UNITED STATES PATENT OFFICE.

CHARLES L. WOOD, OF OSHKOSH, WISCONSIN.

DUST-REMOVING APPARATUS.

SPECIFICATION forming part of Letters Patent No. 345,610, dated July 13, 1886.

Application filed March 3, 1886. Serial No. 193,853. (No model.)

*To all whom it may concern:*

Be it known that I, CHARLES L. WOOD, of Oshkosh, in the county of Winnebago and State of Wisconsin, have invented new and useful improvements in suction-blast apparatus for removing dust from the surface of doors and other irregular surfaces while being finished by the surface-planer or sandpapering-machine, of which the following is a specification.

The suction-blast for the removal of dust from wood-working and other machines is well known; but it fails to remove the fine dust from the re-entering angles, corners, and depressions of panels and the like, and hence doors and other like structures come from the surface-finishing machine with the angles and depressions loaded with dust, which must be afterward removed by brushes, and constitutes a considerable nuisance.

The object of my invention is to remove this dust while passing the finishing-machine, and convey it away with the suction-blast, so that the work will leave the machine thoroughly cleansed. To do this it is necessary to disturb and remove the dust from said angles and depressions by the direct application of force, which may be exerted by a system of brushes worked in the mouth of the suction-tube; but I prefer to avoid the use of mechanism for this purpose by employing strong jets of air projected directly into said angles and cavities to forcibly blow the dust out therefrom and into the suction-blast, whereby it will be conveyed away.

Figure 4:
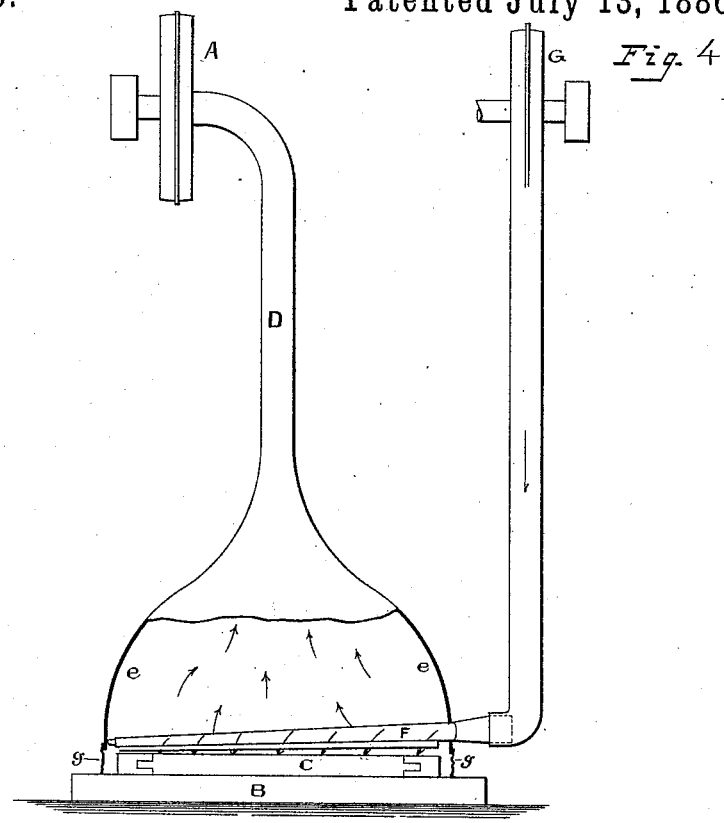
Figure 5:
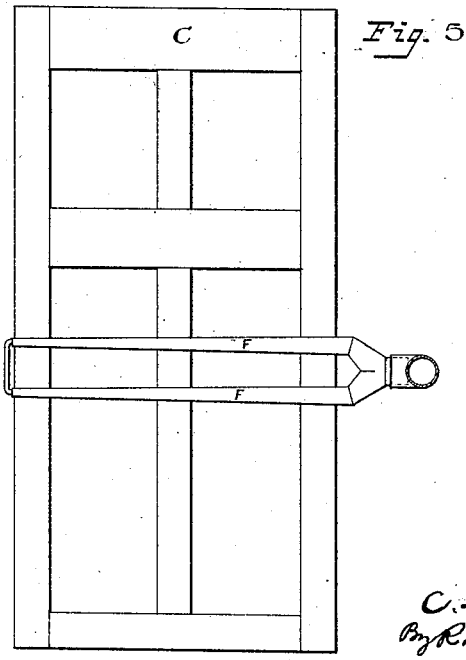

In the accompanying drawings, Figure 1 is a bottom plan of my jet-tubes. Fig. 2 is a vertical transverse section on lines $x\ x$. Fig. 3 is a vertical transverse section on lines $y\ y$.
Fig. 4 is an elevation, partly in section, showing my apparatus in operative position. Fig. 5 is a plan of the same with the suction-hood removed.

A is the suction-blower.

B is part of a planing, sandpapering, or other finishing-machine, over which the door or other like structure, C, is passed for treatment.

The suction-blast pipe D is provided with a mouth, $e$, sufficiently wide to extend over the entire width of the door C, and it has within it two or more blast-pipes, F, taking wind from a supplemental blower, G. The pipes F have jet-openings $h$ along their lower surfaces, directed obliquely in different directions downward toward the door C, so that as the door passes along a forcible jet of air will be projected into every angle and depression from one direction or another, and the dust effectually blown out and upward, where it is caught and carried away by the suction-blast.

I usually attach to the edges of the suction-blast-pipe mouth $e$ strips of rubber $g$, which hang down and contact the surface of the door, so as to close the space there and prevent entrance of the suction-blast through that space.

It is apparent that the relative arrangements of the jet and suction blasts may be greatly varied to suit the peculiarities of the kind of work under treatment without in the least altering the effect produced—to wit, the removal of dust from cavities or entering angles and carrying the same away in the suction-blast, for the purpose of thoroughly cleansing the surfaces, as set forth. The suction-blast fan should be of larger capacity than the jet-blast, so that the latter will not entirely supply the former, and the escape of dust into the apartment will be prevented.

Having described my invention, I claim—

1. The wood-working or finishing machine B and the suction-blast fan provided with a suction-hood, as usual, combined with a supplemental blast-fan and a duct therefrom extending into the space under or in front of said hood, said duct being provided with jet-holes in various directions, whereby jets of air are projected into the angles and cavities of the article under treatment to blow the dust therefrom into the suction-blast, as set forth.

2. A suction-blast fan, A, provided with a duct, D, and hood $e$, combined with the blast-fan G, with a duct, and connected therewith jet-pipes F under said hood $e$, said tube F being provided with jet-openings $h$, adapted to blow dust from the angles and corners of paneled or molded wood-work into the suction-blast, substantially as set forth.

3. A suction-blast fan, A, provided with duct D, hood e, and curtain g, and the table B, combined with the blast-fan G, provided with a duct, and jet-pipe f, arranged between said table and hood, said jet-pipe being provided with jet-openings h, directed in various directions toward said table, for the purpose set forth.

CHARLES L. WOOD.

Witnesses:
E. B. HAYES,
GEO. C. RAMSEY.